(12) United States Patent
Kaba

(10) Patent No.: US 9,725,121 B2
(45) Date of Patent: Aug. 8, 2017

(54) VEHICLE FRONT STRUCTURE

(71) Applicant: SUZUKI MOTOR CORPORATION, Hamamatsu (JP)

(72) Inventor: Hiroto Kaba, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 15/163,248

(22) Filed: May 24, 2016

(65) Prior Publication Data

US 2016/0347375 A1 Dec. 1, 2016

(30) Foreign Application Priority Data

May 28, 2015 (JP) .................... 2015-108558

(51) Int. Cl.
*B62D 25/08* (2006.01)
*B62D 25/10* (2006.01)
*B60R 21/34* (2011.01)

(52) U.S. Cl.
CPC ............ *B62D 25/082* (2013.01); *B60R 21/34* (2013.01); *B62D 25/081* (2013.01); *B62D 25/105* (2013.01); *B60R 2021/343* (2013.01)

(58) Field of Classification Search
CPC ...... B60R 21/34; B62D 25/08; B62D 25/081; B62D 25/082; B62D 25/10; B62D 25/105; B62D 25/163
USPC .................. 296/192, 193.09, 193.11, 203.02
See application file for complete search history.

(56) References Cited

U.S. PATENT DOCUMENTS

| | | | | |
|---|---|---|---|---|
| 6,409,255 B2 * | 6/2002 | Tilsner | ................. | B62D 25/082 296/187.09 |
| 6,698,820 B2 * | 3/2004 | Nakata | .................... | B60R 21/34 293/120 |
| 7,775,585 B2 * | 8/2010 | Feeser | .................... | B62D 25/16 296/198 |
| 7,832,793 B2 * | 11/2010 | Garnweidner | .......... | B60R 21/34 180/274 |
| 8,944,495 B2 * | 2/2015 | Tsuneyama | .......... | B62D 25/163 296/193.09 |
| 2003/0015890 A1 * | 1/2003 | Ahn | ........................ | B60R 21/34 296/203.02 |

(Continued)

FOREIGN PATENT DOCUMENTS

JP 2008105548 A * 5/2008 .......... B62D 25/163
JP 2009-161141 7/2009

*Primary Examiner* — Jason S Daniels
(74) *Attorney, Agent, or Firm* — Silicon Valley Patent Group LLP

(57) ABSTRACT

A vehicle front structure is provided that can absorb collision energy with respect to not only a load from above but also a lateral load. A vehicle front structure includes a cowl side panel, a front hood, a fender panel forming a seam with the front hood, a fender upper cover disposed extending in a vehicle front-rear direction, and a bracket connecting the cowl side panel and the fender upper cover to each other and serving to dispose the fender upper cover at a predetermined position. The fender upper cover has an attachment wall to which the bracket is fixed and an inclined wall extending upward from an end of the attachment wall on an outward side with respect to a vehicle width direction while being inclined inward with respect to the vehicle width direction, and covering the seam from inside a vehicle.

4 Claims, 9 Drawing Sheets

(56) References Cited

U.S. PATENT DOCUMENTS

2015/0166118 A1* 6/2015 Kwon .................... B62D 25/12
296/198

* cited by examiner

C-C

C-C

VEHICLE FRONT STRUCTURE

CROSS-REFERENCE TO RELATED APPLICATION

This application is based upon and claims the benefit of priority from the prior Japanese Patent Application No. 2015-108558, filed on May 28, 2015, the entire contents of which are incorporated herein by reference.

FIELD

The present invention relates to a vehicle front structure including a front hood covering an engine compartment from above and a fender panel constituting a vehicle side surface and forming a seam with the front hood.

BACKGROUND

A front hood and a fender panel of a vehicle form a seam with each other, and components in the engine compartment are visible through the seam. Thus, the appearance is unattractive, and this has conventionally been regarded as a problem. To address this issue, this seam has been covered from inside the vehicle so as to make the appearance attractive. For example, Japanese Patent Laid-Open Publication No. 2009-161141 discloses a configuration in which the seam is covered by a fender protector 50 from inside the vehicle so as to improve the appearance.

On the other hand, with a technology such as that disclosed in Japanese Patent Laid-Open Publication No. 2009-161141, if the front hood or the fender panel is dented due to a colliding body (e.g., a pedestrian) colliding with the vehicle, the dented front hood or fender panel immediately comes into contact with the fender protector 50 that is disposed in extremely close proximity to the front hood and the fender panel. That is to say, there is the problem of reduction of the crash stroke. Thus, in Japanese Patent Laid-Open Publication No. 2009-161141, the crash stroke is increased by releasing the coupling between the fender protector 50 and an apron upper member 30 disposed under the fender protector 50 in the case where a certain load is input.

However, there is a problem with the coupling between the fender protector 50 and the apron upper member 30 disclosed in Japanese Patent Laid-Open Publication No. 2009-161141 in that this coupling is only effective against a load from above and cannot cope with a lateral load.

The present invention was made in view of such problems, and it is an object thereof to provide a vehicle front structure that can absorb a collision energy with respect to not only a load from above but also a lateral load.

SUMMARY OF THE DISCLOSURE

In order to solve the foregoing problems, a representative configuration of a vehicle front structure according to the present invention includes a cowl side panel constituting a side portion of an engine compartment, a front hood covering the engine compartment from above, a fender panel constituting a side surface of a vehicle on an outward side of the cowl side panel with respect to a vehicle width direction and forming a seam with the front hood, a fender upper cover disposed extending in a vehicle front-rear direction, and a bracket connecting the cowl side panel and the fender upper cover to each other and serving to dispose the fender upper cover at a predetermined position on the outward side of the cowl side panel with respect to the vehicle width direction and higher than the cowl side panel, wherein the fender upper cover has an attachment wall which is substantially parallel to the front hood and to which the bracket is fixed, and an inclined wall extending upward from an end of the attachment wall on the outward side with respect to the vehicle width direction while being inclined inward with respect to the vehicle width direction, and covering the seam from inside the vehicle.

With the vehicle front structure according to the present invention, the inclined wall, provided in the fender upper cover, extending upward while being inclined inward with respect to the vehicle width direction covers the seam between the front hood and the fender panel from inside the vehicle. Accordingly, not only in the case where a shock due to a colliding body such as a pedestrian comes from above but also in the case where a shock comes from a lateral side, the front hood is depressed downward and causes the inclined wall to bend toward the attachment wall, and therefore a collision energy can be absorbed. Thus, damage to the pedestrian or the like can be reduced.

That is to say, according to the present invention, even though the seam between front hood and the fender panel is covered from inside the vehicle by the fender upper cover in extremely close proximity thereto, the fender upper cover is appropriately flattened or deformed regardless of the direction from which a shock comes, and thus does no longer constitute a factor in reduction of crash stroke.

It is preferable that the fender upper cover further has a vertical wall extending downward from an end of the attachment wall on an inward side with respect to the vehicle width direction, and at least a lower end of the vertical wall is inclined in such a manner that when following the lower end downward, it is tilted outward in the vehicle width direction.

With this configuration, in the event of a collision, the inclined lower end of the vertical wall comes into surface contact with the cowl side panel. Accordingly, a load due to the collision can be smoothly transferred to the cowl side panel, and the collision energy can be more efficiently absorbed.

It is preferable that the fender upper cover has a weakened portion at a boundary between the attachment wall and the inclined wall, the weakened portion having lower rigidity than its surroundings.

With this configuration, the weakened portion can help the inclined wall bend toward the attachment wall in the event of a collision. For this reason, in the event of a collision, the inclined wall easily bends toward the attachment wall. Moreover, although the bracket having high rigidity does not deform even if a shock is applied thereto, the fender upper cover is detached from the bracket due to the weakened portion of the attachment wall. Accordingly, the fender upper cover is easily depressed downward when a shock is applied thereto. This behavior of the fender upper cover enables efficient and quick absorption of the collision energy.

With the present invention, it is possible to provide a vehicle front structure that can absorb collision energy with respect to not only a load from above but also a lateral load.

DETAILED DESCRIPTION

Figure 1:
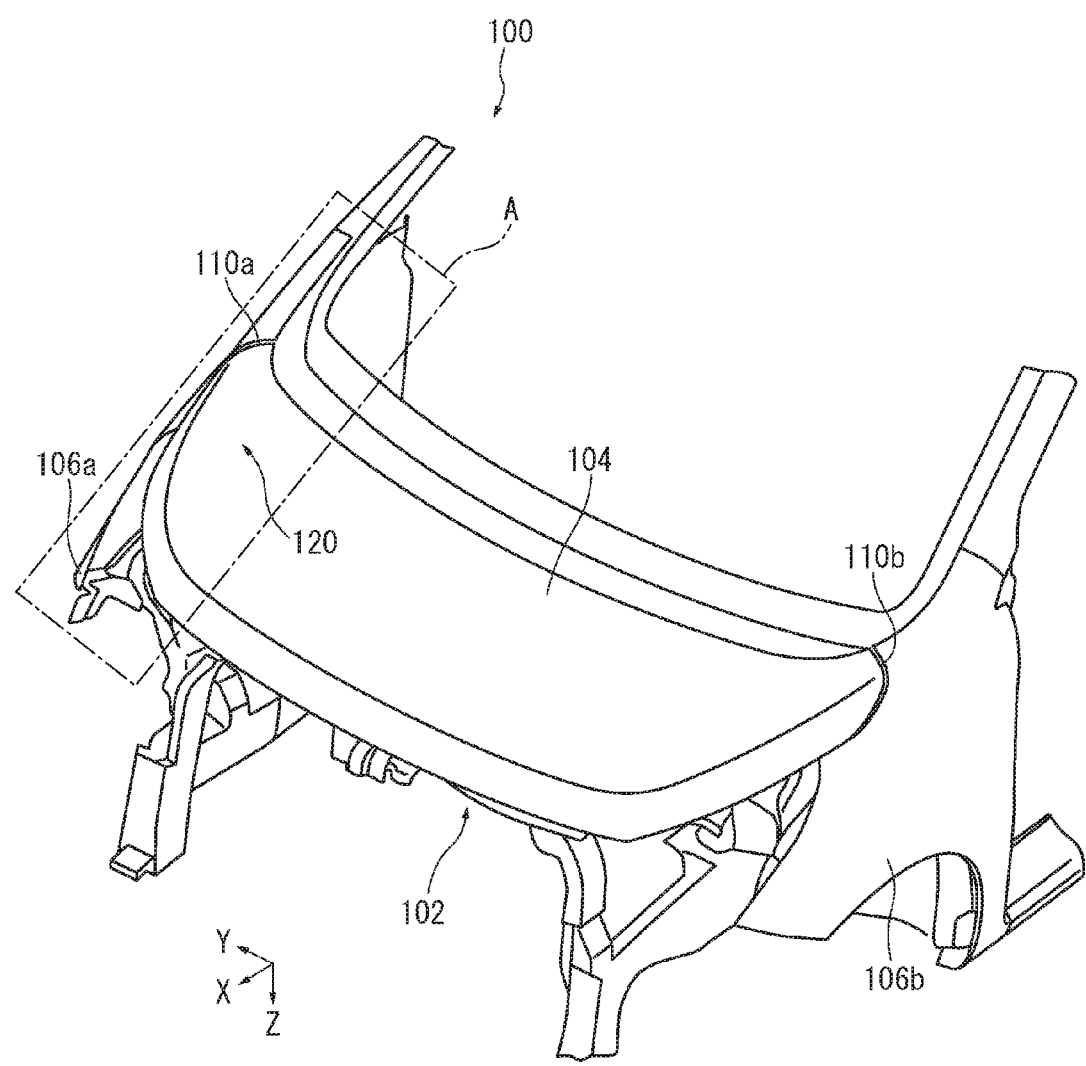
FIG. 1 shows a vehicle to which a vehicle front structure according to an embodiment of the present invention is applied.

Hereinafter, preferred embodiments of the present invention will be described in detail with reference to the accompanying drawings. The dimensions, materials, and other specific numerical values described in the embodiments are merely examples for facilitating the understanding of the present invention, and are not to be construed as limiting the invention unless otherwise stated. It should be noted that elements constituting substantially identical functions and configurations are denoted by identical reference numerals in the present specification and the drawings, and hence redundant description has been omitted. Also, illustration of elements that are not directly relevant to the present invention has been omitted.

FIG. 1 shows a vehicle 100 to which a vehicle front structure 120 according to an embodiment of the present invention is applied. It should be noted that arrows X, Y, and Z in the drawings described below indicate a vehicle front side, a vehicle right side, and a vehicle lower side, respectively.

As shown in FIG. 1, a front hood 104 and fender panels 106a and 106b are arranged in a front portion of the vehicle 100. The front hood 104 is a panel that covers an engine compartment 102 from above. The fender panels 106a and 106b are panels that cover an upper side of front tires, which are not shown, and that form vehicle side surfaces, which are design surfaces. The fender panels 106a and 106b form seams 110a and 110b, respectively, with the front hood 104.

Figure 2:
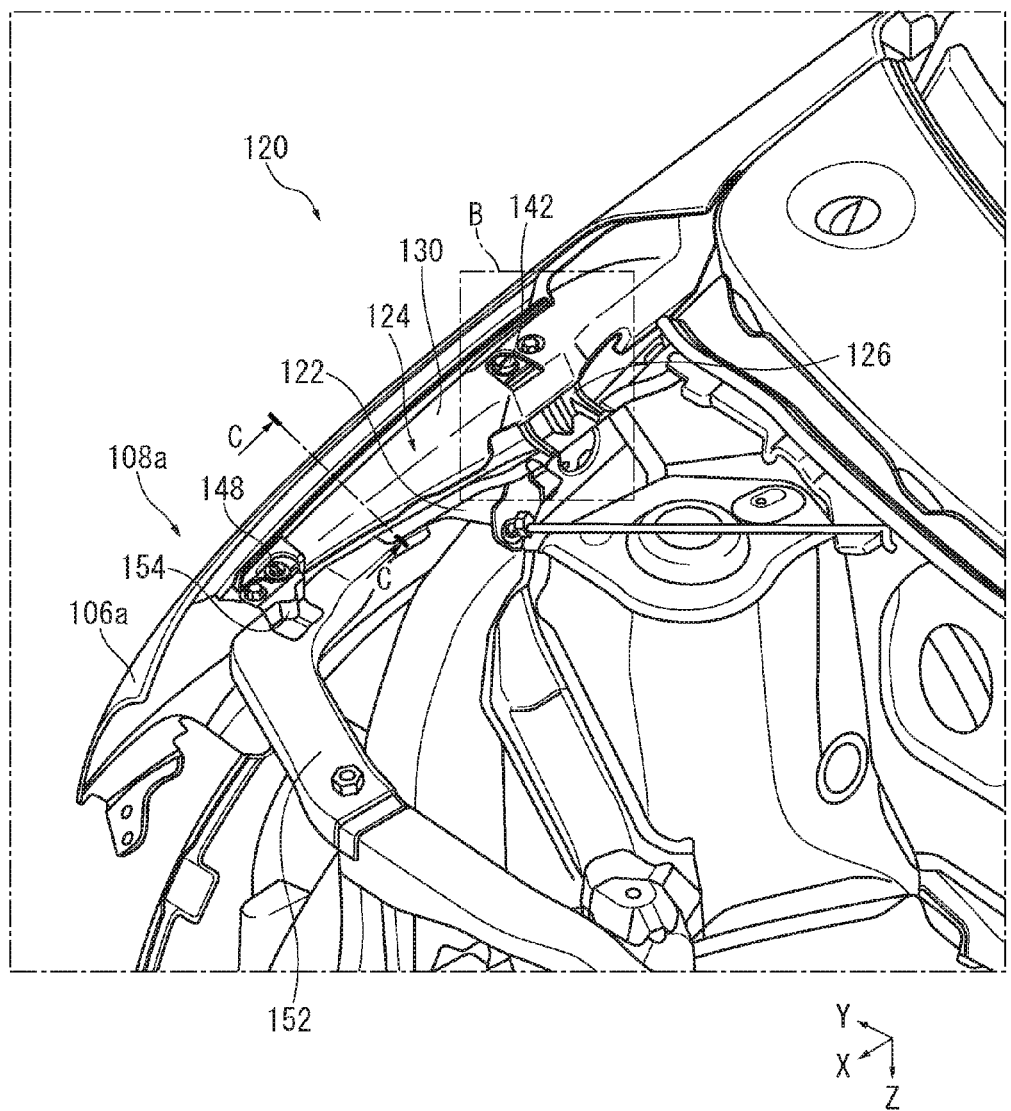
FIG. 2 is an enlarged view of a region A in FIG. 1.

FIG. 2 is an enlarged view of a region A in FIG. 1 and shows a state in which the front hood 104 is omitted. It should be noted that FIG. 2 shows only the vehicle front structure 120 on the right side of the vehicle 100 as an example. A vehicle front structure on the left side has a configuration symmetrical to that of the vehicle front structure on the right side, and thus its illustration and description are omitted.

As shown in FIG. 2, in addition to the above-described front hood 104 (FIG. 1) and the fender panel 106a, the vehicle front structure 120 includes a cowl side panel 122 that constitutes a side portion of the engine compartment 102 and a fender upper cover 124 that is disposed extending in a vehicle front-rear direction on an outward side of the cowl side panel 122 with respect to a vehicle width direction.

Figure 3:
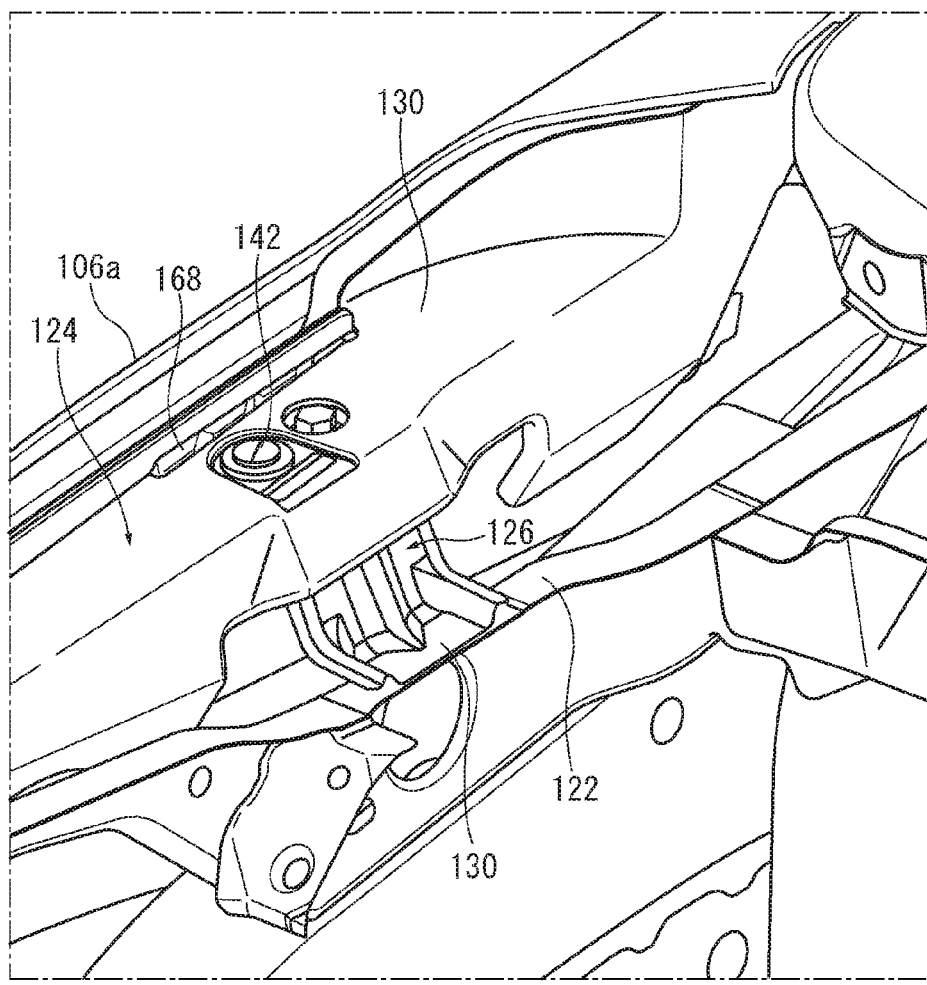
FIG. 3 is an enlarged view of a region B in FIG. 2.

FIG. 3 is an enlarged view of a region B in FIG. 2. The vehicle front structure 120 further includes a bracket 126. As shown in FIG. 3, the bracket 126 has a predetermined length in a vehicle upper-lower direction, connects the cowl side panel 122 and the fender upper cover 124 to each other, and retains the fender upper cover 124. Moreover, the bracket 126 also retains the fender panel 106a.

Figure 4:
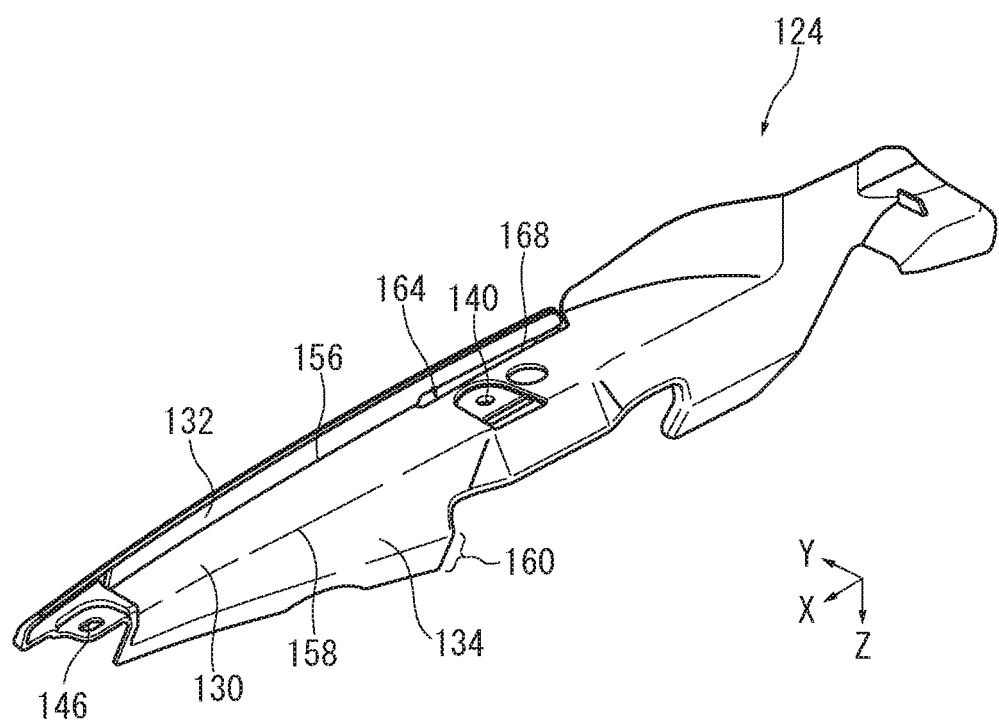
FIG. 4 is a perspective view showing only a fender upper cover in FIG. 1 in an enlarged manner.

FIG. 4 is an enlarged perspective view of only the fender upper cover 124 in FIG. 1. In FIG. 4, the fender upper cover 124 is made of a resin, and has an attachment wall 130, an inclined wall 132, and a vertical wall 134. As shown in FIG. 4, in the present embodiment, the attachment wall 130 has a clip hole 140 formed substantially in the center of the fender upper cover 124. The attachment wall 130 is fixed to the bracket 126 shown in FIG. 3 by inserting a clip 142 (see FIGS. 2 and 3) into this clip hole 140. Moreover, the attachment wall 130 also has a clip hole 146 on the vehicle front side and is fixed to a bracket 154 (FIG. 2) using a clip 148 (FIG. 2), the bracket 154 being connected to a panel 152 constituting the engine compartment 102. It should be noted that it is sufficient if the attachment wall 130 has at least one portion (clip hole 140 in FIG. 4) where the attachment wall 130 is fixed to the bracket 126 connected to the cowl side panel 122.

Figure 5:
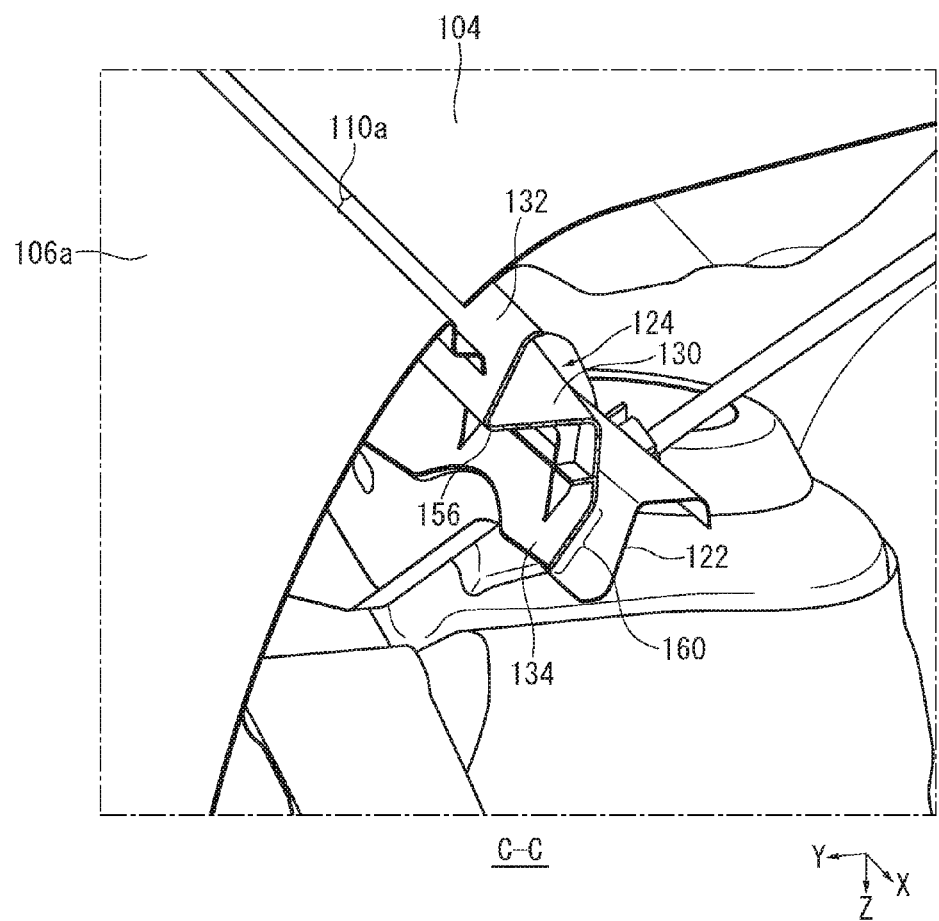
FIG. 5 is a perspective view showing a cross section of the vehicle front structure in FIG. 2 taken along straight line C-C.

FIG. 5 is a perspective view showing a cross section of the vehicle front structure 120 in FIG. 2 taken along straight line C-C. In FIG. 5, this cross section is viewed from a vehicle right front side. As shown in FIG. 5, the fender upper cover 124 is disposed extending under the seam 110a, along the seam 110a. More specifically, the inclined wall 132, of the fender upper cover 124, that extends upward from an end 156 of the attachment wall 130 on an outward side with respect to the vehicle width direction while being inclined inward with respect to the vehicle width direction covers the seam 110a from inside the vehicle.

Figure 6:
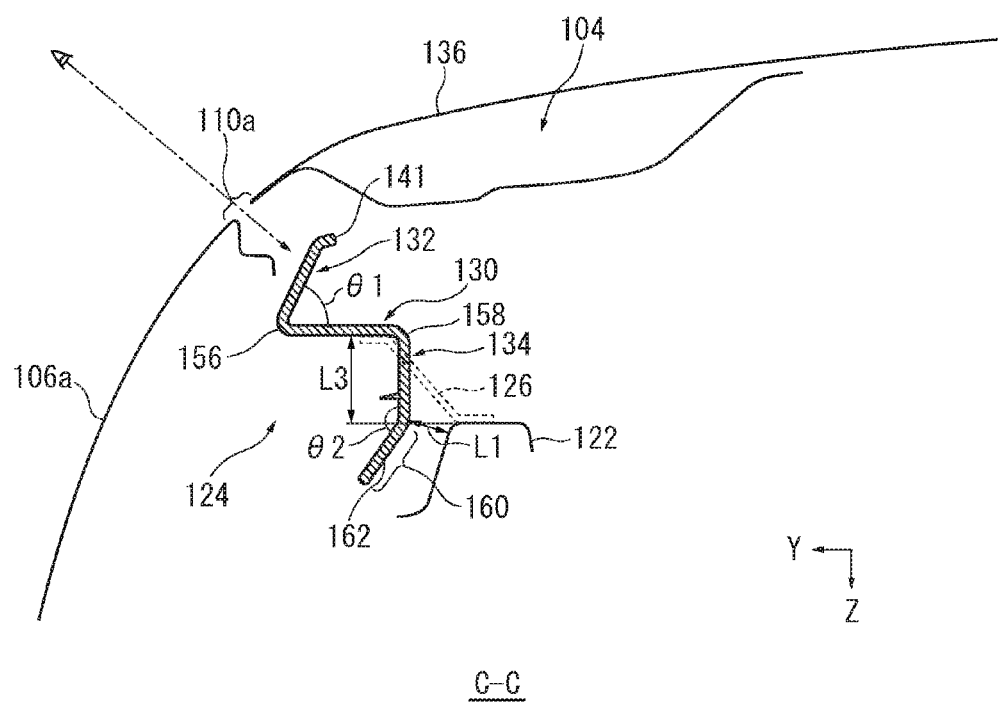
FIG. 6 is a schematic cross-sectional view showing the cross section of the vehicle front structure in FIG. 2 taken along straight line C-C.

FIG. 6 is a schematic cross-sectional view showing the cross section of the vehicle front structure in FIG. 2 taken along straight line C-C. Although the bracket 126 shown in FIG. 3 is seen in the cross section shown in FIG. 6, the bracket 126 is located behind (rearward of) other elements and therefore indicated by the dashed lines in FIG. 6 for the sake of convenience. The bracket 126 is coupled to the cowl side panel 122 at one end, extends upward therefrom while being inclined outward with respect to the vehicle width direction at a predetermined angle, and is coupled to the attachment wall 130 of the fender upper cover 124 at the other end. Thus, as shown in FIG. 6, the bracket 126 serves to dispose the fender upper cover 124 at a predetermined position that is located on the outward side of the cowl side panel 122 with respect to the vehicle width direction and that is partially higher than the cowl side panel 122.

As shown in FIG. 6, an angle θ1 of inward inclination of the inclined wall 132 with respect to the vehicle width direction is not greater than 90 degrees. The inclined wall 132 may extend upward to any desired position as long as the inclined wall 132 covers the seam 110a from inside the vehicle. Moreover, as shown in FIG. 6, the attachment wall 130 is substantially parallel to a surface 136 of the front hood 104.

In the present embodiment, as shown in FIG. 6, a length L3 of the bracket 126 in the upper-lower direction and a position at which the attachment wall 130 is attached are determined such that at least the inclined wall 132 of the fender upper cover 124 is located at a higher position than the cowl side panel 122.

As illustrated in FIG. 6, an upper end 141 of the inclined wall 132 is curved so as to point in the vehicle width direction. With this configuration, when the front hood 104 is depressed under an excessive load and comes into contact with the inclined wall 132, piercing of the front hood 104 with the upper end 141 of the inclined wall 132 is avoided, and thus the shock can be reduced. It should be noted that the shape of the inclined wall 132 is not limited to this shape and may be any suitable shape.

As shown in FIG. 6, the vertical wall 134 shown in FIG. 4 extends downward from an end 158 of the attachment wall 130 on an inward side with respect to the vehicle width direction. If an excessive load is applied to the front hood 104 by a collided body such as a pedestrian, for example, and causes the entire fender upper cover 124 to move downward, the vertical wall 134 comes into contact with the cowl side panel 122 and transfers the collision energy to the cowl side panel 122.

As shown in FIGS. 5 and 6, at least a lower end 160 of the vertical wall 134 is inclined in such a manner that when following the lower end 160 downward, it is tilted outward in the vehicle width direction. The purpose of this is to allow a surface 162 of the vertical wall 134 on the cowl side panel side to abut against the cowl side panel 122 when the vertical wall 134 comes into contact with the cowl side panel 122 and thereby reduce the shock resulting from the contact between the vertical wall 134 and the cowl side panel 122. An angle θ2 of inclination may be set at any desired value in accordance with the shape of the cowl side panel 122 and a distance L1 from the vertical wall 134 to the cowl side panel 122.

Reference is again made to FIG. 4. The fender upper cover 124 has a weakened portion 164 at a boundary (end 156) between the attachment wall 130 and the inclined wall 132, and the weakened portion 164 has lower rigidity than its surroundings. The weakened portion 164 is provided to reduce the rigidity of the end 156 and the attachment wall 130 and make it easy for the inclined wall 132 to be flattened or the attachment wall 130 to be deformed. In the present embodiment, the weakened portion 164 is a slit 168 formed in the vicinity of the clip hole 140. It should be noted that the means for realizing the weakened portion 164 is not limited to the slit 168 of the present embodiment and may also be realized by a groove or the like, for example.

As shown in FIGS. 5 and 6, during normal times, the inclined wall 132 covering the seam 110a from inside the vehicle prevents components in the engine compartment 102 from being visible, because even if a person attempts to look into the engine compartment through the seam 110a, the view is blocked by the inclined wall 132.

Figure 7:
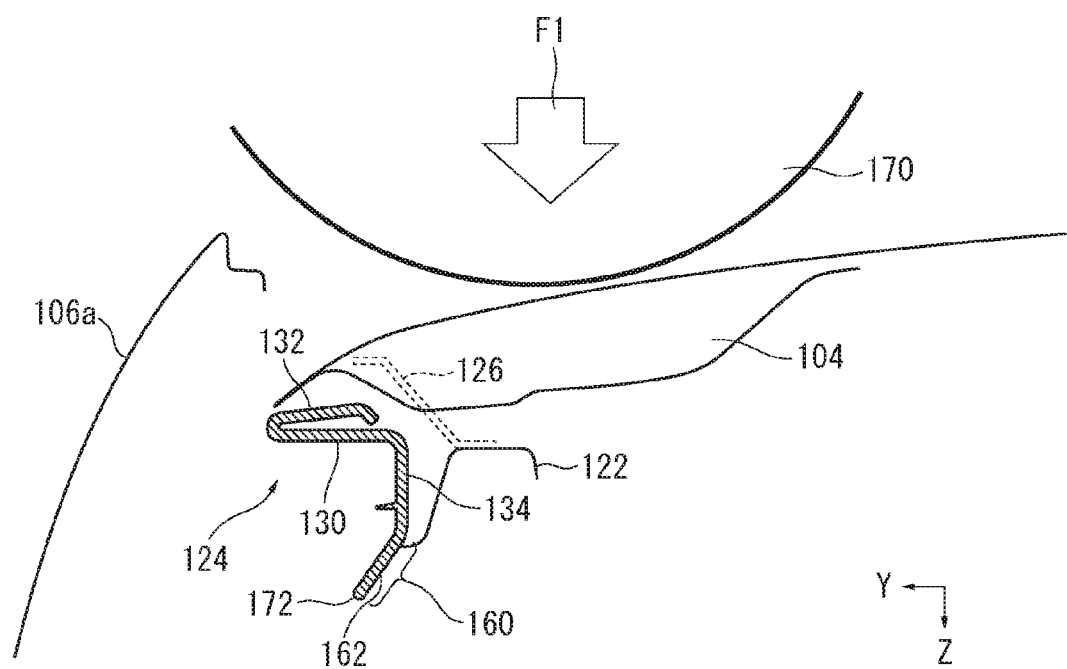
FIG. 7 illustrates a situation in which an excessive load is applied to a front hood in FIG. 6 from above.

Hereinafter, the behavior according to the present embodiment in the event of a collision will be described with reference to FIGS. 7 to 9. FIG. 7 is a diagram corresponding to FIG. 6 and illustrating a situation in which the front hood 104 of the vehicle in FIG. 1 receives an excessive load from above due to a collided body colliding with the front hood 104 from above. In FIG. 7, in the case where the front hood 104 receives an excessive load from above due to a collided body 170 colliding with the front hood 104 from above as indicated by arrow F1, the front hood 104 moves down and hits the inclined wall 132 of the fender upper cover 124. Thus, the inclined wall 132, which is inclined, collapses toward the attachment wall 130 in a bending manner and is flattened, thereby absorbing the load.

Moreover, due to the front hood 104 colliding with the inclined wall 132, the entire fender upper cover 124 is depressed downward. Thus, the cowl side panel 122 and the vertical wall 134 collide with each other. Since at least the lower end 160 of the vertical wall 134 is inclined in such a manner that when following the lower end 160 downward, it is tilted outward in the vehicle width direction, the surface 162 of the vertical wall 134 on the cowl side panel 122 side abuts against the cowl side panel 122. Accordingly, when compared with the case where a lower end point 172 of the vertical wall 134 collides with the cowl side panel 122, the shock resulting from the contact between the vertical wall 134 and the cowl side panel 122 can be reduced, so that the collision energy can be smoothly transferred to the cowl side panel 122.

Figure 8:
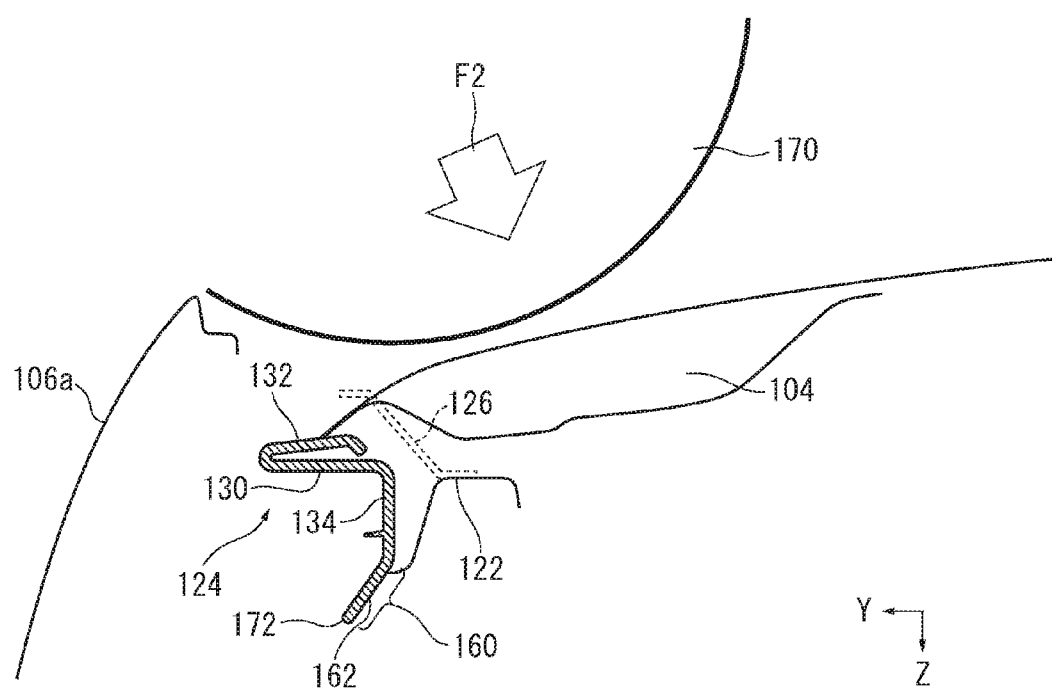
FIG. 8 illustrates a situation in which an excessive load is applied to the front hood in FIG. 6 from a lateral side.

FIG. 8 is a diagram corresponding to FIG. 6 and illustrating a situation in which the front hood 104 of the vehicle in FIG. 1 receives an excessive load from a lateral side due to the collided body 170 laterally colliding with the front hood 104. As shown in FIG. 8, in the case where the collided body 170 laterally collides with the front hood 104 as indicated by arrow F2, although the front hood 104 moves downward, the front hood 104 additionally moves to a vehicle left side (in the direction opposite to arrow Y) when compared with the case shown in FIG. 7. However, according to the present embodiment, since the inclined wall 132, which is inclined, covers the seam 110a, even if the front hood 104 additionally moves to the vehicle left side, the front hood 104 still hits the inclined wall 132. Thus, the inclined wall 132 collapses toward the attachment wall 130 in a bending manner and is flattened, thereby absorbing the load.

It should be noted that although not shown, in the case where the fender panel 106a is dented toward the inside of the vehicle due to an excessive load being applied from a lateral side, for example, the dented fender panel 106a hits the inclined wall 132 as well, because the inclined wall 132 is inclined. Thus, the inclined wall 132 is flattened, and the entire fender upper cover 124 is depressed downward. Therefore, the collision energy can be absorbed.

As described above, according to the present embodiment, whether a load comes from a lateral direction or an upper direction, the collision energy can be absorbed. That is to say, according to the present embodiment, even though the seam 110a between the front hood 104 and the fender panel 106a is covered from inside the vehicle, by the fender upper cover 124 in extremely close proximity thereto, the fender upper cover 124 is appropriately flattened or deformed regardless of the direction from which a shock comes, and thus does no longer constitute a factor in reduction of crash stroke.

Moreover, the present embodiment has the following effects due to the weakened portion 164, which has already been described. The structure around the clip hole 140 of the fender upper cover 124 shown in FIG. 4 is complex and hard, because the bracket 126 is connected thereto. However, according to the present embodiment, the slit 168 forms the weakened portion 164 in the fender upper cover 124. Therefore, in the event of a collision, although the bracket 126 having high rigidity does not deform even when a shock is applied thereto, the fender upper cover 124 easily deforms due to the presence of the weakened portion 164 and is detached from the bracket 126 as shown in FIGS. 7 and 8. This behavior of the fender upper cover 124 enables efficient and quick absorption of the collision energy.

Figure 9:
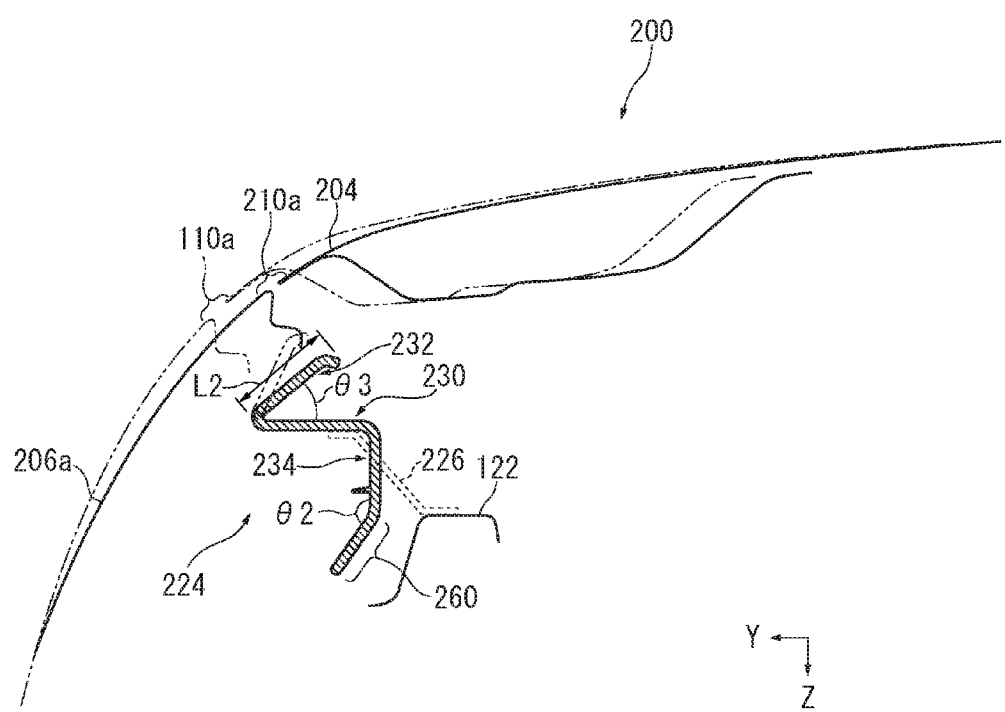
FIG. 9 is a diagram corresponding to FIG. 6 and showing another embodiment of the present invention.

FIG. 9 is a diagram corresponding to FIG. 6 and showing another embodiment of the present invention. In FIG. 9, elements similar to those of the vehicle front structure shown in FIGS. 1 to 8 are denoted by the same reference numerals, and their description is omitted. In a vehicle 200 shown in FIG. 9, a seam 210a between a front hood 204 and a fender panel 206a is located at a higher position than the seam 110a (indicated by the long dashed double-short dashed lines in FIG. 9) shown in FIG. 6. In this case as well, the seam 210a can be covered from inside the vehicle by setting an angle θ3 of inclination of an inclined wall 232 of a fender upper cover 224 to be smaller than the angle θ1 of inclination in FIG. 6. It should be noted that in this case as well, an attachment wall 230 of the fender upper cover 224 is fixed to a bracket 226 such that at least the inclined wall 232 is located at a higher position than the cowl side panel 122. Moreover, at least a lower end 260 of a vertical wall 234 may be inclined at the angle θ2 of inclination in such a manner that when following the lower end 260 downward, it is tilted outward in the vehicle width direction.

As described above, the present embodiment is also adaptable to the seam 210a, which is located at a position different from that of the seam 110a, by setting the angle θ3 of inclination of the inclined wall 232. It should be noted that the shape of the fender upper cover may be adjusted by changing a distance L2 for which the inclined wall extends upward, for example, or may be adjusted by changing both of the angle θ3 of inclination and the upward extending distance L2. As described above, according to the present invention, whatever position in the vehicle side surface the seam is located at, the seam can be covered from inside the vehicle during normal times, and in the event of a collision, a large crash stroke is secured and any shock can be absorbed regardless of whether the shock comes from above or a lateral side.

While preferred embodiments of the present invention have been described above with reference to the accompanying drawings, it should be appreciated that the foregoing embodiments are merely preferred examples of the present invention, and embodiments other than those embodiments can also be implemented or executed using various methods. The invention is not limited to the shapes, sizes, configurations and arrangements, and the like of components that have been shown in the accompanying drawings in detail, unless stated otherwise in the specification. Moreover, the wordings and terms as used in the specification are for illustrative purposes only and are not to be construed as limiting the invention unless stated otherwise.

Therefore, it will be apparent for a person skilled in the art that various modifications and variations may be made within the scope of the invention as defined in the appended claims, and those modifications and variations should be understood to be included within the technical scope of the present invention.

The present invention can be utilized in a vehicle front structure including a front hood covering an engine compartment from above and a fender panel constituting a vehicle side surface and forming a seam with the front hood.

The invention claimed is:

1. A vehicle front structure comprising:
   a cowl side panel constituting a side portion of an engine compartment;
   a front hood covering the engine compartment from above;
   a fender panel constituting a side surface of the vehicle on an outward side of the cowl side panel with respect to a vehicle width direction and forming a seam with the front hood;
   a fender upper cover disposed extending in a vehicle front-rear direction; and
   a bracket connecting the cowl side panel and the fender upper cover to each other and serving to dispose the fender upper cover at a predetermined position on the outward side of the cowl side panel with respect to the vehicle width direction and higher than the cowl side panel,
   wherein the fender upper cover has:
      an attachment wall which is substantially parallel to the front hood and to which the bracket is fixed; and
      an inclined wall extending upward from an end of the attachment wall on the outward side with respect to the vehicle width direction while being inclined inward with respect to the vehicle width direction, and covering the seam from inside the vehicle.

2. The vehicle front structure according to claim 1, wherein
   the fender upper cover further has a vertical wall extending downward from an end of the attachment wall on an inward side with respect to the vehicle width direction, and
   at least a lower end of the vertical wall is inclined in such a manner that when following the lower end downward, it is tilted outward in the vehicle width direction.

3. The vehicle front structure according to claim 1, wherein the fender upper cover has a weakened portion at a boundary between the attachment wall and the inclined wall, the weakened portion having lower rigidity than its surroundings.

4. The vehicle front structure according to claim 2, wherein the fender upper cover has a weakened portion at a boundary between the attachment wall and the inclined wall, the weakened portion having lower rigidity than its surroundings.

* * * * *